United States Patent
Mixdorf et al.

(10) Patent No.: US 8,412,597 B1
(45) Date of Patent: Apr. 2, 2013

(54) SYSTEM FOR TARGETING MESSAGES TO CONSUMERS BASED ON DETERMINATION OF CURRENT OWNERSHIP

(76) Inventors: Sheila Mixdorf, Cedar Falls, IA (US); Curtis DeGroote, Waterloo, IA (US); Scott Davis, Cedar Falls, IA (US); Brad Nichols, Cedar Falls, IA (US)

( * ) Notice: Subject to any disclaimer, the term of this patent is extended or adjusted under 35 U.S.C. 154(b) by 480 days.

(21) Appl. No.: 12/460,149

(22) Filed: Jul. 14, 2009

(51) Int. Cl.
*G06Q 10/00* (2012.01)

(52) U.S. Cl. .......... 705/30; 705/26; 705/27; 705/75; 707/104.1; 707/783; 707/10

(58) Field of Classification Search .......... 705/26, 705/27, 75
See application file for complete search history.

(56) References Cited

U.S. PATENT DOCUMENTS

| 7,653,625 B1 * | 1/2010 | Frankel et al. ............... 707/783 |
| 2008/0052184 A1 * | 2/2008 | Junger et al. .................. 705/26 |

* cited by examiner

*Primary Examiner* — Vanel Frenel
(74) *Attorney, Agent, or Firm* — Camille L. Urban; David M. Breiner; G. Brian Pingel

(57) ABSTRACT

A computer program enabling the determination of an inference related to the purchase of an item by a customer. The program analyzes certain public information relative to an entity's customer database and then calculates an inferred value and assigns it to the relevant customer. The database is then sorted according to certain inferred values and customers are provided specially tailored information.

5 Claims, 2 Drawing Sheets

EXAMPLE OF ONE APPLICATION

1. Access Customer Database

2. Store first set of data for each customer, e.g.
   - Customer information/address
   - VIN number
   - Date of purchase
   - Customer identifier 3. Create First Electronic Database using first sets of data 4. Access other database and Store second sets of data
   - VIN number
   - date of registration 5. Create Second Electronic Database using second sets of data 6. Compare First Electronic Database with Second Electronic Database
   If VIN# = VIN #, append date of registration to First Electronic Datebase 7. Compare date of purchase to date of registration
   - If date = date, then set flag to "ownership"
   - If date = date, then set flag to "nonownership"

8. Append first electronic database

9. Segment first electronic database
   - still own
   - no longer own
   - no match (unidentifiable)

10. Apply business rules to further segment
    - time since original purchase
    - suppress "no matches"

11. Standardize addresses of Appended first electronic database
    - Compare to National Change of Address file
    - Amend Addresses of Appended first Electronic Database accordingly 12. Upload to Customer Database, overwrite, and append 12. Apply Marketing Rules

FIG. 2

SYSTEM FOR TARGETING MESSAGES TO CONSUMERS BASED ON DETERMINATION OF CURRENT OWNERSHIP

BACKGROUND OF THE INVENTION

1. Field of Invention

The present invention is related to analyzing certain public information relative to an entity's customer data in order to calculate an inferred value assigned to a customer and provide specially tailored information to that customer.

2. Background

Target marketing is the art of sending marketing messages to a group of specific receivers based on a characteristic or characteristics shared by members of the group. Targeting messages in this manner creates more efficient marketing strategies i.e. less money spent on messages that are ineffective and/or less money spent on groups that include a high number of receivers with no connection either to the message or, perhaps, to the product. This technique has been used now for a number of years and has, in some industries, replaced many of the marketing campaigns aimed at providing information about a product to a broad spectrum of receivers with campaigns that include messages specifically targeted and addressed to small subgroups of intended receivers. Characteristics used to target include any one of or a combination of factors such as age, gender, address, socioeconomic status derived from residential address, profession, alumni status, etc.

Another variety of target marketing includes mining the data in a customer data base. Many businesses maintain information pertaining to past customers and the transactions these customers have made with the business. That information, in turn, can be used to target certain messages to those past customers encouraging them to transact additional business.

One problem with target marketing is that targeting the message can only be as precise and appropriate as the underlying data upon which it is based. The quality of the underlying data is effected by a number of factors not the least of which are changes related to time. In the situation where customer purchasing information is used, there may be a time lag between purchase and marketing for the next purchase. During that time, the customer may move so that his address is no longer correct. When a message is sent to an incorrect address, it typically results in a "miss" and an expenditure. In target marketing activities related to enticing a past buyer to replace, upgrade or accessorize a previous purchase, the problem is compounded. In addition to possible address changes, the purchaser may have sold or otherwise disposed of the previous purchase. Without the current status of ownership, any messages sent to encourage replacing, upgrading or accessorizing will be moot and result in an expense without possibility of return on the investment in marketing.

A method and system is needed to infer whether the purchaser of a particular item still owns that item. Once known, that information allows an accurately targeted marketing message to that purchaser.

It is, therefore, one object of the present invention to collect, select, and analyze information to provide more accurate inferences regarding a specific consumer, his present address, and his ownership status of a particular good.

It is another object of the present invention to provide a method of more accurately targeting a particular group of consumers according to their ownership status or possession.

It is yet another object of the present invention to control costs of target marketing by reducing the number of consumers to target while increasing the efficiency of the marketing efforts employed.

It is a final object of the present invention to identify past customers who still own a particular good, calculate and present a specific offer to each customer that still owns the good wherein the specific offer may be tailored to a number of factors including, but not limited to, an assessed level of use of the original good, financial information used by the customer to purchase the original good or otherwise present in the customer database, current interest rates or special offers by the business, a replacement item based on historical data about other similar customers' buying patterns.

SUMMARY

The present invention addresses the shortcomings of the prior art by providing an apparatus by which more accurate inferences about a target recipient's address, present status of ownership or possession of a particular object, the length of time in possession, and the likelihood of readiness to replace or accessorize may be made. Specifically, the preferred embodiment of the method includes collecting data from several sources, comparing certain data elements in common, and creating an inference or inferences based on the comparisons. Other embodiments include using the data and inferences to: group consumers, construct specific marketing messages, calculate and present offers, and determine which good the consumer is most likely to purchase next.

The apparatus comprises computer readable media having software program code stored thereon which, in turn, configures a computer's processor according to the software to perform certain functions. The invention contemplates the software having several modules which may or may not be separable and which may be used by a single computer or by several computers, and several electronic databases which may or may not be created by a single entity. Herein, the term module or logic module simply means a set of software code that configures a computer's processor to perform a certain logical procedure or procedures. It does not necessarily follow that each such module be physically separate or separable from the others nor that each module can be used in a stand-alone application, although that is not precluded by the invention.

The apparatus embodies a software program. The software program may be downloadable or nondownloadable, provided via internet, disc, etc., and comprises several logic modules wherein each module configures a computer's processor to perform certain functions. All modules may be resident and operate on a single computer such that a single processor is configured to perform all of the functions necessary to obtain the objectives of the invention. In the alternative, certain modules may be accessible to configure a first computer's processor while other modules may be accessible for configuring a second computer's processor, etc. Additional computers may be employed for different functions, and, as needed, be configured by the relevant module. Each logic module is described herein as having a particular purpose, however, this specificity does not dictate the modules to be wholly physically or functionally separable. Rather, the term module is a convenient way of grouping together related functions.

The invention, in its most general form, provides a computer software program embodying functions that assist in finding a specific group of people in a database. The group of people identified by the preferred embodiment share the following two commonalities: a) at one point each one purchased an item having a unique identifier and 2) it is inferred that person still owns the item having the unique identifier.

More often than not, a customer database may include information pertaining both to the buyer and to the items he purchases from the seller. However, unless the seller has ongoing contact with the customer and that ongoing contact pertains to the item, it is not likely the seller knows whether the customer still owns the item he purchased from the seller. If the seller knew the date the item was purchased, the identity of the item, whether the customer still owns it, and typical upgrading, replacing, and accessorizing patterns of similar purchasers over time, then the seller could specifically target messages to the customer based on that information. For example, if the item purchased was a car, and if the seller knows that most purchasers of that model replace it within about 3 years, then if the seller also knew the customer's current address and whether the car is still owned by that customer, the seller could accordingly create messages of a highly precise nature. The seller could send written contact to the past customer identifying the car he still owns and providing a trade-in value of that car on a new one of the same model, including monthly payment amounts and other specifics about the deal. In other words, the seller could make a bona fide offer of terms to the customer. This approach may also be applied to other items having typical lifetimes or repurchase/upgrade patterns such as electronics, recreational equipment such as boats and ATV's, and jewelry. The key to making the most accurately targeted message and being able to create a set of offer terms is to determine whether the original buyer still owns the item.

If the buyer not only purchased the item but continues to have it serviced by the seller and the seller records such information, then the task is simple as all needed data is present in a single database. If, on the other hand and as is much more common, the seller has no additional contact with the buyer then the seller has no idea whether the item is still owned by the buyer nor even whether the buyer lives at the same address as he did at the time of purchase. In this case, other data must be obtained and inferences made regarding ownership and current address.

The success of the most basic form of the software program of the present invention to create inferences of ownership and current addresses hinges on the presence of a registration system wherein the transfer of ownership of the item is recorded each time it is transferred and that recordation can be accessed by the entity wishing to identify individuals who still own a particular item. One example would be automobiles and other vehicles that leave the factory in which they are made with a vehicle identification number. Upon sale of the vehicle to a purchaser, the vehicle must be registered. It's registration number and the date of purchase/registration is then associated with its vehicle identification number. If the sale was made by a dealership, this information is typically recorded in that entity's customer database as well as by a government maintained database. Upon sale of the vehicle to another, the vehicle will be registered again and this time a new purchase/registration date will be recorded in association with its vehicle identification number in the government database. However, the new date will not be available to be recorded in the dealer's customer database. If it can be determined that the officially recorded registration date for the vehicle is the same as it was on the purchase from the dealership, then it can be inferred that the original purchaser still owns the vehicle. The registration date will change only if a new registration occurs and a new registration occurs only when the vehicle's ownership changes.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

BRIEF DESCRIPTION OF THE DRAWINGS

FIG. 2 is a schematic of the preferred embodiment of the invention showing a process for updating addresses using a national database and segregating according to an inference of ownership.

DESCRIPTION OF THE PREFERRED EMBODIMENT

Figure 1:
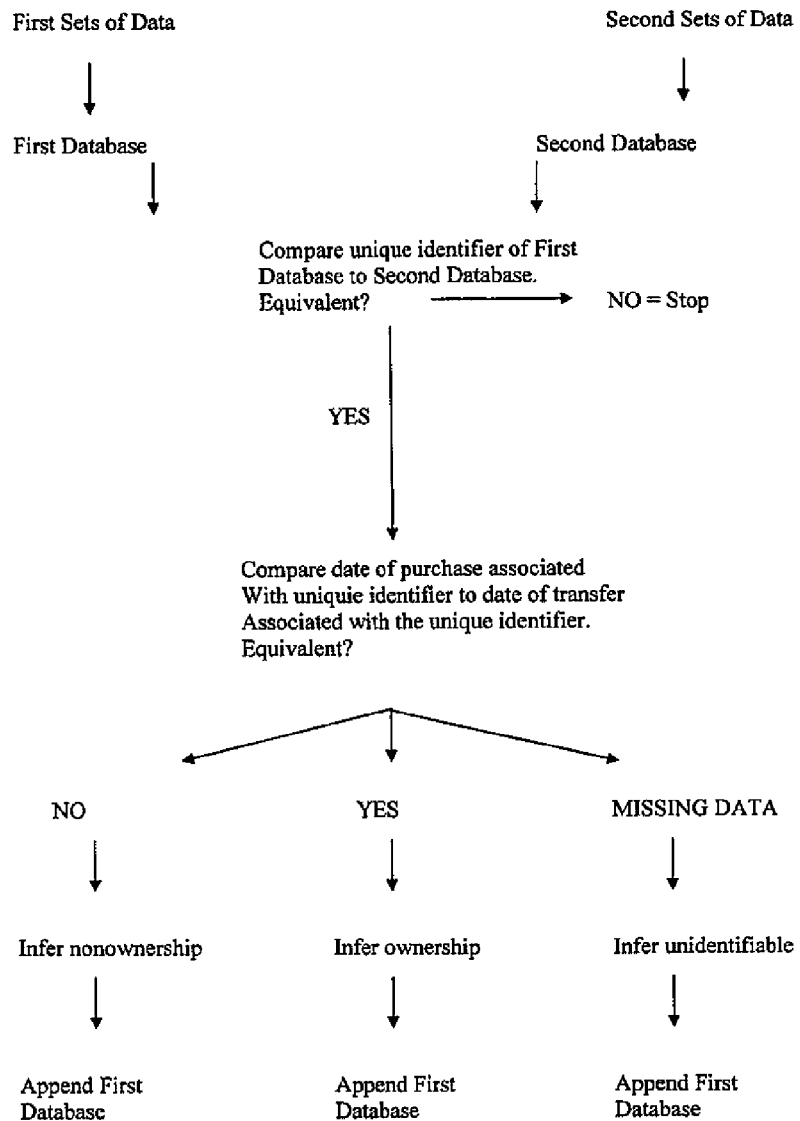
FIG. 1 is a schematic of the initial portion of the preferred embodiment of the invention showing the process for obtaining and assigning an inference of ownership.

The present invention is a computer program product. The product enables a computer system to identify a specific group of owners of items by employing several computer readable program code means. The system identifies the group based on a common unique identifier and a comparison of two dates which are also associated with the unique identifier.

Although the invention encompasses comparing within a single database specific dates associated with a common identifier, the preferred invention contemplates obtaining a first set of data and a second set of data for comparison. The system includes a first computer readable program code means for storing said first set of data. The first set of data includes at least a unique identifier associated with a single item that was purchased, and a date or time of purchase. Preferably, the first set of data also includes an identifier of the buyer which may include first and last name and, preferably, a mailing address of the buyer.

A second computer readable program code means enables the computer to record a plurality of first sets of data to form a first electronic database. The system includes a third computer readable program code to enable a computer (either the same computer as stores the first set of data and records the first electronic database or a different computer) to store a second set of data which includes the same unique identifier, and a date or time of transfer. Preferably, a plurality of second sets of data are combined to form a second electronic database which the computer is enabled to record by a fourth computer readable program code.

While it is possible that the first and second electronic databases are created or maintained by the same entity, it is equally and, perhaps more likely, that they will be created and/or maintained by separate entities. Where such is the case, a program means may be necessary to format one database to be uniform with the other prior to continuing in the system. Further, it is contemplated that the first electronic database may be akin to a customer database and the second may be a database created by the government which has a variety of data elements. For example, a government database may comprise a vehicle identification number (VIN #) and registration date for vehicles. Or, the second electronic database may be one that is derived from a government-originated database and include all or a subset of that data.

A fifth computer readable program code means enables the computer to compare the first electronic database and the second electronic database to identify any unique identifier in common with each database and, for each unique identifier in common, enables the computer to compare the time of transfer and the time of registration to determine if they are equivalent and, if they are equivalent, to provide an inference of current ownership. Clearly, each of these tasks could be accomplished separately by separate program code means and/or by different computers, as well.

Through a sixth computer readable program code means, the computer is enabled to associate each inference of current ownership with the appropriate unique identifier in common and to append the first electronic database to reflect that association. It should be apparent, however, that the second electronic database could be appended rather than or in addition to the first and that an inference of common ownership may take several of many forms including setting a flag or assigning a numeric or alpha code to the unique identifier's record. In the preferred embodiment, an indication of inference is selected from the group: ownership, nonownership, and unidentifiable where unidentifiable simply means a unique identifier in one database was not present in the other.

A seventh computer readable program code means enables the computer to select all of the unique identifiers with which an inference of common ownership is associated to form the group of owners of items.

It is preferable to update any address information that might exist in the appended first electronic database. Specifically, if the first electronic database includes mailing addresses each associated with a distinct identifier of the buyer such as first and last name, then the computer product includes a software arrangement which enables the computer to compare the distinct identifier with a separate address database which also includes a distinct identifier of the same substance associated with a mailing address. The software arrangement enables the computer to determine if the mailing address on the address database differs from that on the first electronic database and, if it differs, to either amend the mailing address on the first electronic database with the mailing address on the address database or to append the first electronic database with the mailing address on the address database resulting in a second appended first electronic database.

While the source of the address database may be any of many, the preferred embodiment employs a national change of address database. Once again, it is contemplated that the format of one or both databases may need to be altered in order to facilitate the comparison, however, such alteration is well within the purview of one of ordinary skill in the art.

The preferred embodiment also includes a logical module which enables the computer to compute an ownership time frame for those unique identifiers where said time of transfer and said time of registration are equivalent. The ownership time frame is the time elapsed between time of transfer and the present and is determined by the computer in accordance with the logical module. Further, the logical module allows for input and storage of a preset timeframe. Once determined, the ownership time frame is compared with a preset time frame. If the ownership time frame exceeds the preset time frame then a different logical module may be employed. This logical module enables the computer to use each of the unique identifiers to determine the identity of each of said plurality of items. Once the items are identified, a pre-selected replacement item is appended to the record.

Yet a further logical module is provided wherein the computer is enabled to provide a trade-in price for the item, a price for each said pre-selected item, and a monthly payment amount to purchase said pre-selected item. In one embodiment, these factors are based on lookup tables; in another, a combination of look up tables and application of computation and interest rates is enabled. Other embodiments may not include a trade-in price or a monthly payment amount; still others may include additional factors such as color, expected wear, warranty information, etc.

Once the computer has determined whether the ownership time frame exceeds the preset time frame for unique identifiers for which an inference of ownership was assigned, the system may be employed in a mail merge application which is well known in the art. The mail merge application allows specifically targeted messages to be sent to those inferred owners based on the time frame of ownership. The targeted message may instead be related to any one or several of the other aspects created by the computer including: identity of a pre-selected item, a monthly payment amount, a trade-in value, interest rates, or others.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced otherwise than as specifically described.

We claim:

1. A computer readable medium comprising a software program having:
   a first logical module for enabling a computer to compare a first electronic database comprising a unique identifier for each of a plurality of items and an indication of a time of transfer of ownership of each of said plurality of items to a second electronic database comprising said unique identifier of each said item and an indication of time of registration of each said item;
   a second logical module for enabling a computer to produce a first set of results comprising an inference for each said unique identifier wherein said time of transfer and said time of registration are equivalent; and
   a third logical module for computing an ownership timeframe for each of said group of unique identifiers and determining if said ownership timeframe is longer than a preset time,
   wherein if said ownership time frame exceeds said pre-set time frame said software program employs a fourth logic module to identify are replacement item and wherein said first set of results comprises setting a flag to indicate an inference selected from the following group: ownership, nonownership, unidentifiable.

2. The computer readable medium of claim 1 further comprising a fifth logical module wherein each of said inferences is associated with one of said unique identifiers and is appended to said first electronic database.

3. The computer readable medium of claim 2 further comprising a sixth logical module for segregating each of said unique identifiers having an inference of ownership from each of said unique identifiers associated with another inference resulting in a group of unique identifiers each associated with the inference of ownership.

4. The computer readable medium of claim 1 wherein said software program further comprises a fifth logic module capable of computing monthly payments required to purchase the replacement item while accounting for a trade-in value of the item associated with the unique identifier.

5. The computer readable medium of claim 1 wherein said software program further comprises a fifth logic module capable of computing monthly payment required to purchase the replacement item.

* * * * *